Figure 1:
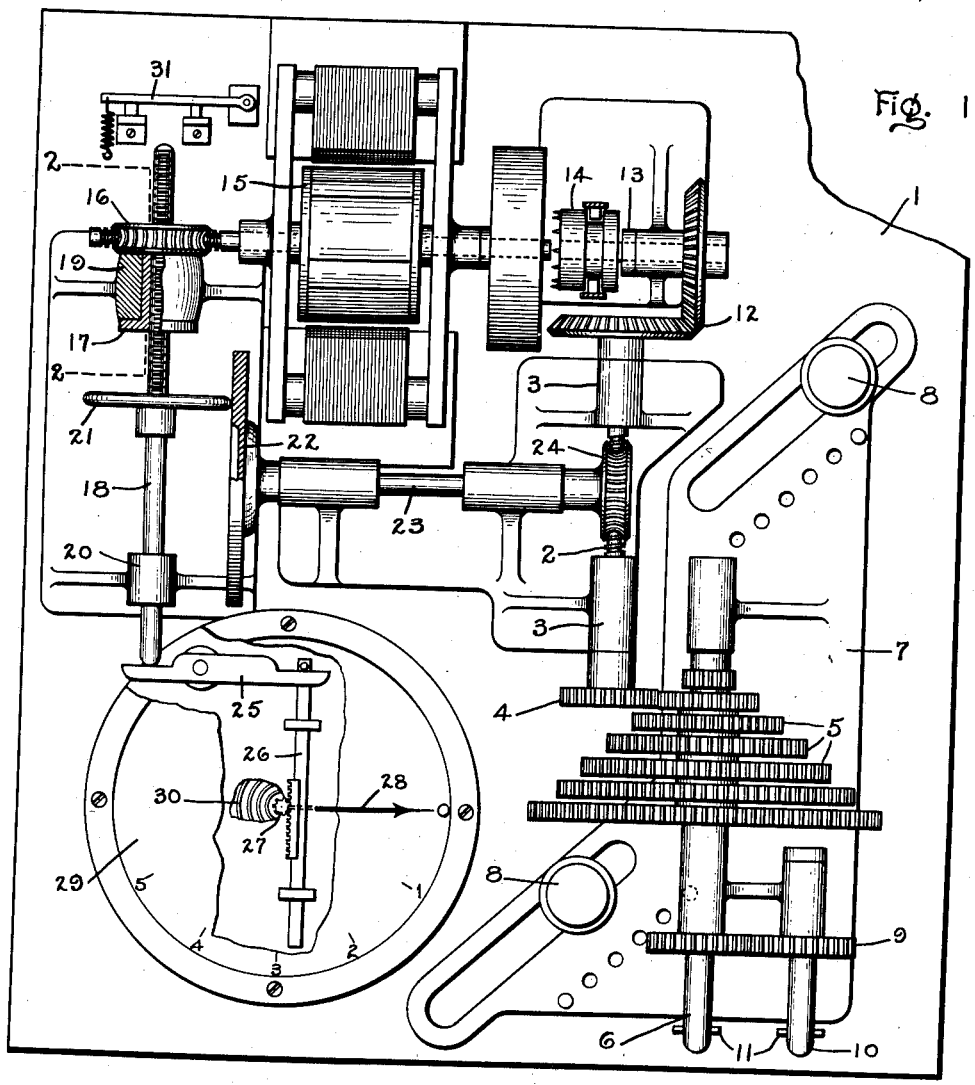

R. MILLER, Jr.
SPEED COMPARING DEVICE.
APPLICATION FILED MAR. 2, 1909.

1,091,686.

Patented Mar. 31, 1914.

WITNESSES:
Lester H. Fulmer
J. Ellis Elen

INVENTOR
ROBERT MILLER, Jr.
BY
ATT'Y.

UNITED STATES PATENT OFFICE.

ROBERT MILLER, JR., OF SCHENECTADY, NEW YORK, ASSIGNOR TO GENERAL ELECTRIC COMPANY, A CORPORATION OF NEW YORK.

SPEED-COMPARING DEVICE.

1,091,686. Specification of Letters Patent. Patented Mar. 31, 1914.

Application filed March 2, 1909. Serial No. 480,897.

*To all whom it may concern:*

Be it known that I, ROBERT MILLER, Jr., a citizen of the United States, residing at Schenectady, county of Schenectady, State of New York, have invented certain new and useful Improvements in Speed-Comparing Devices, of which the following is a specification.

My invention relates to devices for readily comparing the velocities of objects which are moving at different velocities, as, for instance, two shafts which rotate at different speeds, a pulley and a belt which is slipping on said pulley, or an induction motor and a synchronous motor driven from the same supply circuit.

One object of my invention is to provide a device which will correctly measure the difference in velocity and directly indicate it in some way which will enable the observer to read the difference directly on a scale.

Another object of my invention is to make provision for preventing injury to the instrument when the difference between the speeds of the two objects is greater or less than the instrument is adapted to measure.

In carrying out my invention, two rotatable members are mounted to rotate about a common axis and are connected to means for moving an indicator when rotating at different speeds. The two members may be connected by means of a screw thread or similar connection which will cause them to approach or to recede from each other in response to a difference in speed between them and consequent relative movement about their axis. Such a structure is illustrated in the drawing. The two objects of which the difference in velocity is to be determined are connected to the two rotatable members in such a way that one of said members is driven at a speed dependent upon the velocity of one of said objects, while the other member is connected to the other object through a variable speed gearing or other similar speed changing connection, which is automatically controlled by said members as they approach or recede from each other and is arranged to vary the speed relation of one of said rotatable members to the object by which it is driven until the two rotatable members rotate at the same speed, although the objects move at different velocities. If the two shafts, for instance, are rotating at the same speed, the two rotatable members will be in definite relation to each other and will be rotating at the same speed. If a difference in speed between the two shafts should arise, the corresponding difference in speed between the two rotatable members would cause said members to move relatively to each other about their axis of rotation and also either to approach or to recede from each other, and thus the speed relation between one of said rotatable members and one of said shafts is varied until the two members again rotate at the same speed, although the two shafts continue to rotate at different speeds. The amount of relative movement of the rotatable members required to bring the two rotatable members to the same speed is a measure of the difference in speed between the two shafts and this relative movement is indicated by any suitable means, such as a pointer, which moves in response to relative movement between said rotatable members.

To prevent injury to the instrument when the difference in speed between the two shafts is greater or less than the instrument is adapted to measure, I provide for the disconnection of the variable speed gearing as will be later described in detail.

Although my invention in its broad aspect is capable of determining the difference in velocity between any objects which are moving at different velocities, it is particularly applicable to determining the difference in speed between rotating shafts, such as the shaft of an induction motor and the shaft of a synchronous motor driven from the same supply circuit, and for the purpose of illustrating one of the many forms in which the invention may be embodied, I have shown, in the accompanying drawings a direct reading slip indicator constructed in accordance with my invention, and in which—

Figure 2:
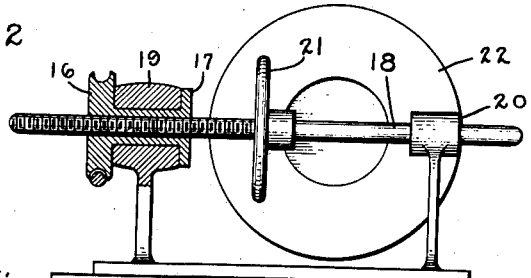

Figure 1 is a plan view of the slip indicator; and Fig. 2 a view partly in section and partly in elevation, along the line 2—2 of Fig. 1.

In the specific form of speed comparing device or slip indicator shown in the drawings and arranged to show the slip of an induction motor by giving a direct indication of the difference in speed between the induction motor and a synchronous motor connected to the supply circuit of the induction motor, the various parts of the device are mounted upon any suitable base 1, which carries a driving mechanism consisting in part of a worm shaft 2, suitably journaled in bearings 3 and connected to the induction motor of which the slip is to be measured by any suitable driving connection, preferably of the construction shown in the drawing, in which a gear 4 mounted on one end of the worm shaft 2 meshes with any one of a series or bank of gears 5 mounted upon a gear shaft 6 which is journaled upon a sliding or adjustable base 7 having slots therein and clamped to the base 1 in any desired position by means of clamping bolts 8. The gear shaft 6 is always driven in the same direction, either by connecting it directly to the induction motor when the motor is rotating in the proper direction or by connecting it to the motor through gears 9, one of which is mounted upon the gear shaft 6 and the other on the short stud shaft 10, both the gear shaft and the stud shaft being provided with pins 11, by means of which they may be rigidly connected to the shaft of the induction motor. The gears 5 increase in diameter in the proper ratio to cause the number of teeth in each gear to correspond to the number of poles of one size of induction motor, so that if a gear having a definite number of teeth corresponds to an eight pole motor, for example, another gear with three-fourths that number of teeth corresponds to a six pole motor, and still another gear with half the number of teeth corresponds to a four pole motor, while adjustment of the sliding base 7 brings any one of the gears 5 into mesh with the gear 4. By properly adjusting the sliding base 7 to correspond to the number of different poles of the induction motor, the worm shaft 2 may be always driven at synchronous speed.

The worm shaft 2, which is driven by the gear 4 mounted on one end has the other end connected by means of bevel gearing 12 to a short countershaft 13 journaled on the base 1 and provided with a clutch member 14 splined on the countershaft and manually controlled in any suitable manner so that the clutch member may be thrown into or out of clutching engagement with the shaft of a synchronous motor 15 mounted on the base 1 with its shaft in alinement with the countershaft 13. As a result of this construction, the synchronous motor 15 may be started by throwing the clutch member 14 into clutching position, whereupon the synchronous motor is driven from the induction motor of which the slip is to be measured at a speed near enough to synchronism with the supply circuit of the induction motor to cause the synchronous motor to take current from the circuit and to run at synchronous speed.

The synchronous motor 15 runs at a constant speed in synchronism with the supply circuit of the induction motor, while the worm shaft 2, which is connected through the gear shaft 6 to the induction motor of which the slip is to be measured, runs at a speed which differs from the speed of the synchronous motor to an extent dependent upon the slip of the induction motor. In accordance with my invention, the synchronous motor is connected by means of worm or other suitable gearing 16, to a controlling member 17 rotatably mounted on the base 1 and connected by means of a screw thread or similar connection to a driven member 18, which is shown in the form of a shaft threaded into the controlling member 17. The controlling member 17 is rotatably mounted in a journal 19 in such a manner that the controlling member can rotate but cannot move along its axis of rotation while the driven member 18 is mounted in a journal 20, which permits the driven member both to rotate and to move longitudinally along its axis of rotation. As long as the controlling member 17 and the driven member 18 are rotating at the same speed there will be no relative movement between them along their axis of rotation, but if there is a difference in speed between them, their relative movement about their axis of rotation will cause the driven member or shaft 18 to travel longitudinally through the controlling member 17 as long as there is a difference of speed between the two members.

While various mechanisms may be used between the members 17 and 18 and their driving mechanisms which will permit the speed relation between the member 17 and the shaft 18 to be varied by endwise movement of the shaft 18, in the preferred construction, the shaft 18 is connected to its driving mechanism through a variable speed gearing, which is of the friction type and comprises a friction wheel 21 fastly mounted on shaft 18 to engage the surface of a friction disk 22 mounted on one end of the driving shaft 23, which is perpendicular to the driven shaft 18 and is rotated by means of a worm wheel 24 in mesh with the worm shaft 2. The driving shaft 23 rotates at a speed directly proportional to the speed of the worm shaft 2 and of the induction motor, while the speed of the driven shaft 18 depends upon the relative position of the friction wheel 21 and the friction disk 22. Any difference in speed between the controlling member 17 and driven member 18 causes an endwise movement of the shaft 18, which carries the friction wheel 21 either toward or away from the driving shaft 23 and thereby varies the speed relation between the driven shaft 18 and the driving shaft 23. The parts are so arranged that if the speed of the driven shaft 18 falls below the speed of the controlling member 17, the resulting movement of the shaft 18 will be toward the controlling member 17, thereby carrying the friction wheel 21 away from the driving shaft 23 and speeding up the driven shaft 18 until it rotates at the same speed as the controlling member 17, while if the speed of the shaft 18 rises above that of the controlling member the shaft 18 moves in the opposite direction.

The longitudinal position of the shaft 18 determines the relation of the friction wheel and the friction disk and is also a direct indication of the difference of speed between the controlling member 17 and the driving shaft 23. The position of the driven shaft 18 may be directly indicated in any suitable way. One construction which may be used for this purpose is that shown in the drawing, in which the endwise movement of the driven shaft 18 is transmitted to an indicating device by means of a pivoted lever 25, having one end in engagement with the end of the driven shaft 18 and the other end connected to a slidable rack 26 in mesh with a pinion 27 on the shaft of an indicator or pointer 28, which swings over any suitable scale 29 and is given a bias toward the zero position by means of a spring 30, which is strong enough to hold the end of the lever 25 always in engagement with the end of the driven shaft 18.

Since the difference in speed between the synchronous motor and the induction motor is not very great unless the slip of the induction motor is excessive, it is unnecessary to make the instrument responsive to a very great difference in speed and in order to avoid injury in case either the induction motor or the synchronous motor should stop, in which case the driven member 18 would tend to move to extreme positions, some suitable arrangement is provided for automatically stopping the rotation of the controlling member 17 and driven member 18 when the difference in speed between them becomes excessive. Various arrangements may be used for this purpose, but in the preferred construction, the disk 22 is recessed near the center in such a manner that the friction wheel 21 is no longer driven when the shaft 18 carries the friction wheel 21 too close to the center of the friction disk 22, while movement of the driven shaft 18 to its extreme position in the other direction will bring its ends into engagement with a switch 31 arranged to open the circuit of the synchronous motor 15 and thereby stop the movement of the controlling member 17. Since the driving rim or engaging portion of the surface of the disk 22 is narrower than the longitudinal travel of the driven shaft 18, the driven shaft cannot be carried in either direction beyond a predetermined limit of movement without carrying the friction wheel out of contact with the friction disk.

My invention may be embodied in many other forms than that shown and described and I do not wish to limit the appended claims to the specific arrangement disclosed, but intend to cover all modifications which are within the spirit and scope of my invention.

What I claim as new and desire to secure by Letters Patent of the United States, is:—

1. A speed comparing device comprising a rotatable and longitudinally movable shaft, driving mechanism for imparting rotation to said shaft, a journaled controlling member threaded on said shaft and held against movement along its axis of rotation, driving mechanism for said controlling member, and variable speed gearing between said shaft and its driving mechanism controlled by longitudinal movement of said shaft.

2. A speed comparing device comprising a journaled controlling member held against displacement along its axis of rotation, a driving mechanism for said member, a rotatably mounted shaft threaded into said controlling member, a friction wheel mounted on said shaft, and driving mechanism for said wheel comprising a friction disk mounted to rotate about an axis perpendicular to said shaft with its surface in engagement with said friction wheel.

3. In a speed comparing device, the combination with two members mounted to rotate about a common axis and connected to move relatively to each other along said axis in response to relative angular movement of said members, of a separate driving mechanism for each of said members, one of said driving mechanisms being constructed to allow the disconnection of one of said members from its driving mechanism in response to relative movement of said members beyond a predetermined limit in each direction.

4. A speed comparing device comprising two rotatably mounted members, connections between them whereby relative angular movement causes relative movement along their axes, a friction wheel mounted on one of said members and a coöperating friction disk mounted with its surface in engagement with said friction wheel and recessed near its center to stop rotating said friction wheel as it approaches the center of said friction disk.

5. In a speed comparing device, in combination a driving member, a driven member and a controlling member mounted to rotate about a common axis, said driven member being threaded to said controlling member and connected to said driving member to be driven thereby at a rate depending on the end-wise displacement of said driven member, and an indicator connected to said driven member to show the endwise displacement thereof.

6. In a speed comparing device, the combination with a driving shaft, a rotatably mounted controlling member and means for rotating said member and said shaft with a difference in speed dependent upon the difference in the two speeds to be compared, of a driven shaft mounted to rotate about the same axis as said controlling member and connected to said controlling member to move endwise in response to difference in speed between them, and variable speed gearing between said driving shaft and said driven shaft controlled by endwise movement of said driven shaft.

7. In a speed comparing device, the combination with a driving shaft, a controlling member mounted to rotate about an axis perpendicular to said driving shaft, and means for rotating said member and said shaft with a difference in speed dependent on the difference of the two speeds to be compared, of a driven shaft mounted to rotate about the same axis as said controlling member and connected thereto to move endwise in response to a difference in speed between said driving shaft and controlling member, and coöperating friction disks on said driving and said driven shafts.

8. In a speed comparing device, the combination with a driving shaft, a controlling member mounted to rotate about an axis perpendicular to said driving shaft, and means for rotating said member and said shaft with a difference in speed dependent on the difference of the two speeds to be compared, of a driven shaft mounted to rotate about the same axis as said controlling member and connected thereto to move endwise in response to a difference in speed between said driving shaft and controlling member, and coöperating friction disks attached to said driving and said driven shafts, the friction disk on said driving shaft having an engaging surface of a width less than the endwise travel of the friction disk on said driven shaft.

9. In a direct reading slip indicator, a controlling member, a synchronous motor, means operatively connecting said motor to said member for driving the member, driving mechanism adapted to be connected to the motor of which the slip is to be determined, a driven member connected to said controlling member to move relatively thereto in response to difference in speed between said members, variable speed gearing connecting said driven member to said driving mechanism, and an indicator for showing the position of said driven member.

10. In a direct reading slip indicator, a controlling member, a synchronous motor for driving said member, driving mechanism arranged to be connected to the motor of which the slip is to be determined, means for indicating the difference in speed between said controlling member and said driving mechanism, and means for connecting said driving mechanism to said synchronous motor to start said synchronous motor.

11. In a direct reading slip indicator, a controlling member, a synchronous motor, means connecting it with said member for driving said member, driving mechanism arranged to be connected to the motor of which the slip is to be determined and comprising a countershaft mounted in alinement with said synchronous motor, means for indicating the difference in speed between said controlling member and said driving mechanism, a clutch for connecting said countershaft to said synchronous motor adapted to be manually controlled.

12. A speed comparing device comprising two members mounted to rotate about a common axis and connected by a screw thread, a separate driving mechanism for each member, means controlled by the relative movement of said members along their axis for maintaining said members at the same speed, and indicating means arranged to show the relative movement of said members, one of said driving mechanisms being constructed to allow the disconnection of one of said members from its driving mechanism in response to relative movement of said members beyond a predetermined limit in each direction.

In witness whereof, I have hereunto set my hand this first day of March, 1909.

ROBERT MILLER, Jr.

Witnesses:
BENJAMIN B. HULL,
HELEN ORFORD.